Patented June 30, 1936

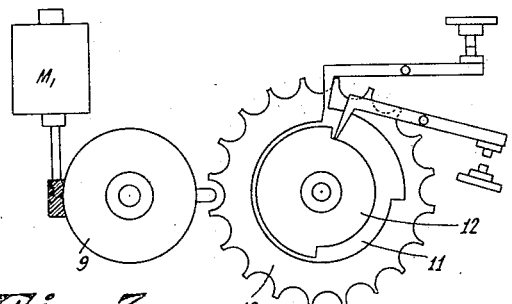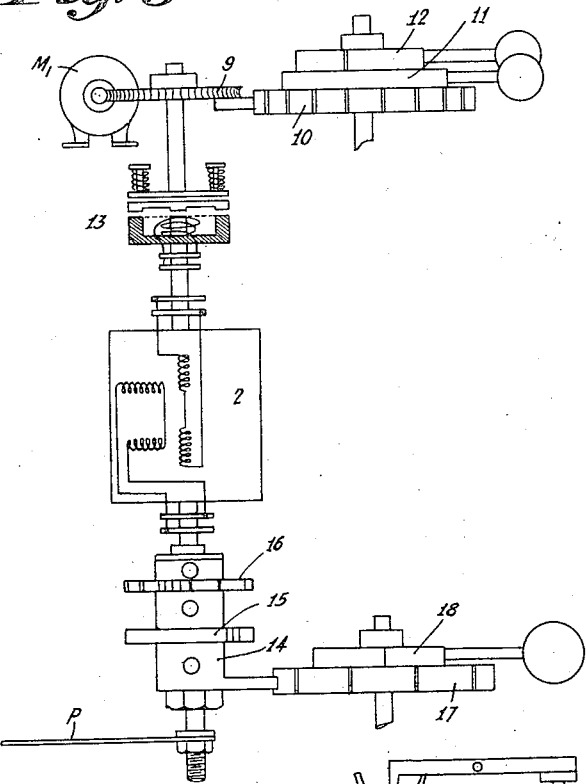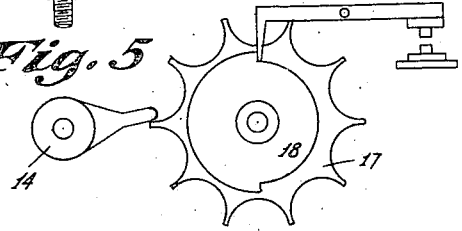

2,045,904

UNITED STATES PATENT OFFICE 2,045,904

RADIO BEACON

John Magarry Furnival, Purley, and William Frederick Bubb, Mitcham, England, assignors to Radio Corporation of America, a corporation of Delaware Application February 21, 1931, Serial No. 517,408
In Great Britain March 5, 1930

7 Claims. (Cl. 250—11)

This invention relates to radio beacons, or, as they are sometimes termed, wireless lighthouses, and has for its object to provide a beacon of such nature as to be utilizable for purposes of direction finding by almost any known kind of radio receiver.

The invention is applicable to the general purposes of radio beacons, and will be found particularly advantageous for providing indications of course and bearing for aircraft and other mobile craft which may be equipped with only simple receiving sets.

According to this invention a radio beacon comprises means for emitting signals in two or more fixed directions in such manner that both signals are received with equal strength in a predetermined directional zone or zones, and means for emitting a rotating directional signal of predetermined speed and direction of rotation, said radio beacon transmitting a suitable predetermined signal combination to indicate the moment when it is passing through a known bearing.

Preferably the beacon is provided with means for emitting at regular intervals a non-directional identification sign.

Preferably also a common aerial system is employed for emitting all three forms of course or bearing indicating radiations.

The means for emitting signals in fixed directions, so as to give, what may be termed, an "equi-signal" course indication emission, may consist of means for emitting alternately two fields of equal strength, said fields being such as to give the customary "figure-of-eight" polar diagrams having their axes in fixed predetermined angular relationship. In this way zones of radiation are obtained such that at any point along these zones signals transmitted in either field will be received with equal intensity.

In one method a letter of the Morse alphabet is repeatedly transmitted in each field, the letters being so chosen and the transmission so timed that the dots and dashes of one signal coincide with the short and long spaces in the other signal. For example, the two signals may be constituted by the Morse letters A and N. The resultant received signal obtained along any of the equi-signal zones will therefore be a continuous dash. One or more of these zones are arranged to fall along a predetermined course or courses, and may be utilized therefore by craft carrying a suitable receiving apparatus to give an indication of the craft's adherence to or deviation from an equi-signal course.

The means for giving the rotative beacon effect may comprise means for emitting a field giving the usual cardioid or figure-of-eight polar diagram, means for rotating said field at a predetermined uniform speed and direction, and means for transmitting a predetermined signal so as to indicate the moment at which the axis of said field passes through a known direction, e. g. north and south.

It will be seen that by means of such a rotating beacon the bearing of a receiver in relation to the transmitter can be calculated from the period of time elapsing between the moment at which this predetermined signal is received and the moment at which the line of minimum field strength passes across the receiver.

The invention is illustrated in the accompanying schematic drawings of which,

Fig. 3 is a plan view of the mechanical arrangements for driving the cams, radiogoniometer, etc.;

Fig. 4 is an end view of Fig. 3, and

Fig. 5 is also an end view of Fig. 3, the view being taken opposite that of Fig. 4.

Figure 1:
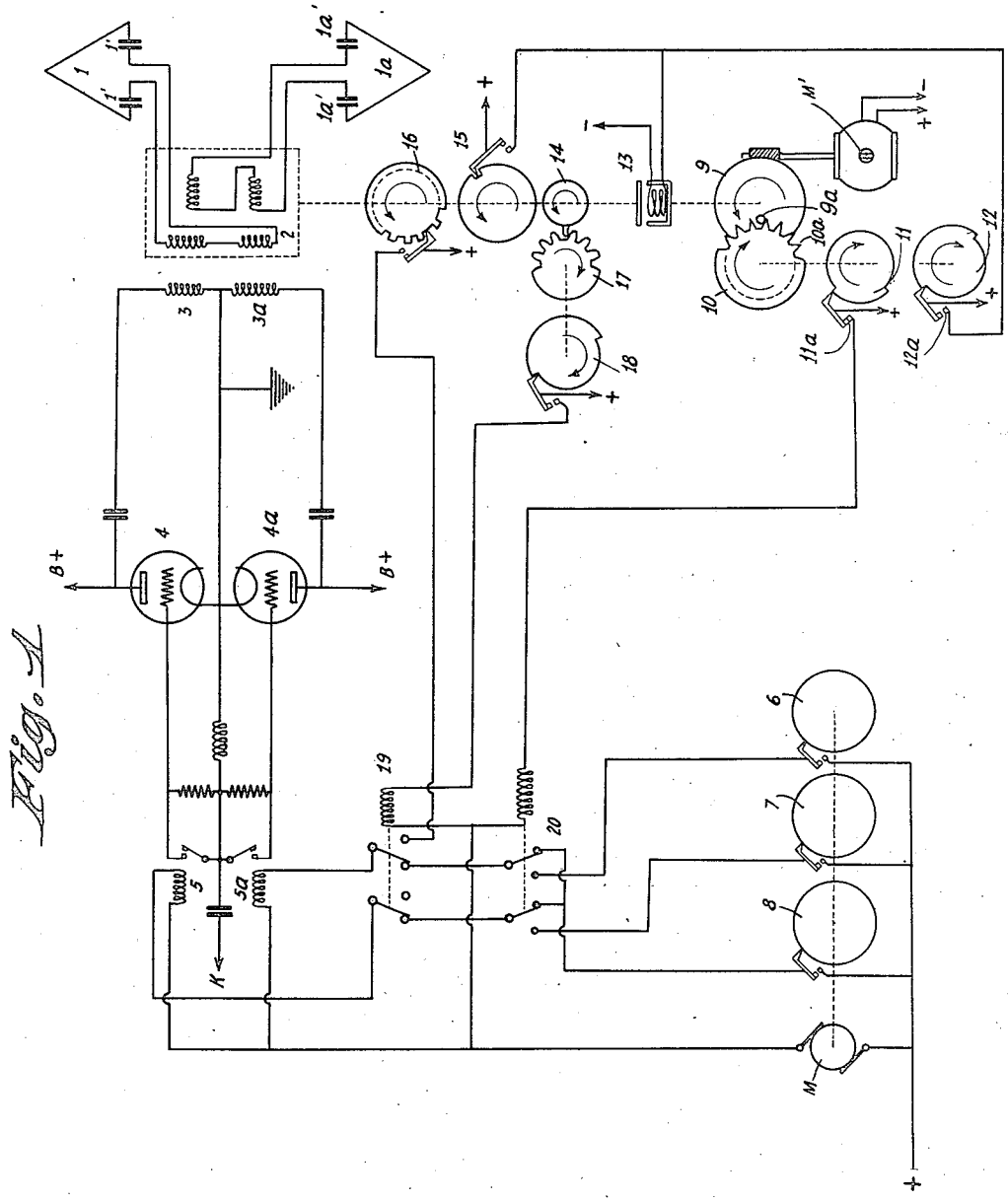
Fig. 1 is a wiring diagram of the electrical circuit.

Referring to Figure 1 of the drawings, which shows the form of transmitting station in accordance with the invention, the station comprises a pair of loop aerials 1 and 1a arranged at right angles to one another in the usual way, and connected through the customary condensers 1', 1a', to coils 2, which energize said loops and form the rotatable secondary coils of a radiogoniometer. In the figure, the rotatable portion of the radiogonimeter is schematically illustrated by an enclosing rectangle, shown in dotted lines, the rotating shaft being indicated by a dotted straight line drawn through the middle of one short side of the rectangle. The stator coils of the radiogoniometer are illustrated at 3 and 3a, and, as will be seen, they are fed with radio frequency energy from the plate circuits of a pair of thermionic magnifiers 4, 4a, whose grid circuits are controlled by magnetically operated keying relays 5, 5a. The lead K is connected to the oscillator (not shown) in the usual way. The relays 5, 5a, have their windings included in the circuits of magnetically operated two-pole change-over switches 19, 20. The switch 19, when energized, open-circuits one end of the winding of the keying relay 5, and connects the winding of the relay 5a so as to be under the control of a cam and contact device 16.

When de-energized, the said change-over switch 19 connects the windings of relays 5, and 5a to the contacts of the second change-over switch 20. The change-over switch, when energized, places the windings of both relays 5 and 5a in parallel under the control of a "call sign" code wheel 8. When the switch 20 is de-energized, the winding of relay 5 is put under the control of a Morse signal wheel 7 (adapted, for example, to transmit the letter N in Morse code), while the winding of relay 5a is put under the control of a second Morse code wheel 6 (adapted, for example, to transmit the Morse letter A). In these circumstances, an equi-signal transmission, as will be described later, will be obtained. The wheels 6, 7 and 8 are mounted on a common shaft and driven from a motor M.

9 is a worm wheel driven at constant speed by the motor $M^1$, and adapted to make, for example, one revolution per minute. The wheel 9 carries a striker pin 9a, as shown, which pin co-operates with the teeth 10a of a twenty-tooth star wheel 10, so that said star wheel will complete one revolution in twenty minutes. On the shaft of the star wheel are mounted a "call-sign" cam 11, whose contacts 11a, when closed, serve to energize the winding of the change-over switch 20, and a clutch cam 12 whose contacts 12a, when closed, are adapted to energize the winding of a magnetic clutch 13 interposed on the shaft, shown in dotted lines, and leading from the worm wheel 9 to the rotatable portion of the radiogoniometer. On this shaft, and upon the side of the clutch adjacent the rotatable portion of the radiogoniometer are mounted a striker wheel 14, a hold-on cam and contact device 15, and a code wheel and contact device 16, the last mentioned device being adapted to emit a train of signals during figure-of-eight transmissions. The striker wheel 14 co-operates with a ten-tooth star wheel 17, upon whose shaft is mounted a cam and contact device 18 whose contacts when closed energize the winding of the change-over switch 19.

The operation of the device is as follows:

Suppose the apparatus to be in the position shown in Figure 1. In this position the contact at 11 has just closed, energizing the winding at 20, so that relays 5, 5a, are being "keyed" under the control of the call-sign wheel 8. The contacts of the clutch cam 12 and the hold-on cam 15 has just been opened, with the result that the clutch 13 is de-energized, and the rotatable portion of the radiogoniometer, together with members 14, 15, 16, 17 and 18 are stationary. The contact at 18 is open and the winding of the switch 19 deenergized.

It will thus be seen that both magnifiers 4 and 4a are simultaneously energizing the loops 1 and 1a, and an approximately non-directional call-sign is therefore being transmitted under the control of the call-sign wheel 8. After five minutes the cam 11 will have been rotated to open its contacts, and in consequence, to de-energize the switch 20. As a result, the relays 5, 5a are put under the control of the signal wheels 7 and 6 respectively, said wheels being so disposed as to transmit the Morse letters A and N in such timed relationship as to give stationary equi-signal zones from the aerials 1, 1a. At the end of a further five minutes, cam 12 closes its contacts, thus energizing the winding of the clutch 13 and occasioning rotation of the shaft carrying the members 2, 14, 15 and 16. As soon as rotation of this shaft commences, the cam 15 closes its contact to complete a holding-on circuit through the winding of the clutch 13. The equi-signal zones are now rotated through space at one revolution per minute (this being the speed of the worm wheel 9) by virtue of the movement of the coils 2 with respect to the coils 3 and 3a. During this period, the striker on the member 14 rotates the wheel 17 which in turn rotates the cam 18 through 180°. At the end of a further five minutes, the contacts at 18 are closed, and the winding of switch 19 energized. This de-energizes relay 5, and thus cuts off the input to the magnifier 4 at the same time connecting the relay 5a associated with the magnifier 4a so that it is under the control of the code wheel and contact device 16. This code wheel revolves with the rotatable portion of the radiogoniometer and transmits a predetermined train of signals, each time the "phantom loop" emitted by the aerial system passes through a predetermined bearing. During the last or tenth revolution of the radiogoniometer shaft, the clutch contacts at 12 open, and on the completion of that revolution, the hold on contacts at 15 also open, thus de-energizing the clutch winding and causing the radiogoniometer to reman stationary at its initial position. At the same time the contacts at 18 are opened, and those at 11 are closed.

The apparatus has thus reached the same setting as it had at the beginning of the twenty minutes above described, and proceeds to repeat the cycle of operations.

Figure 2:
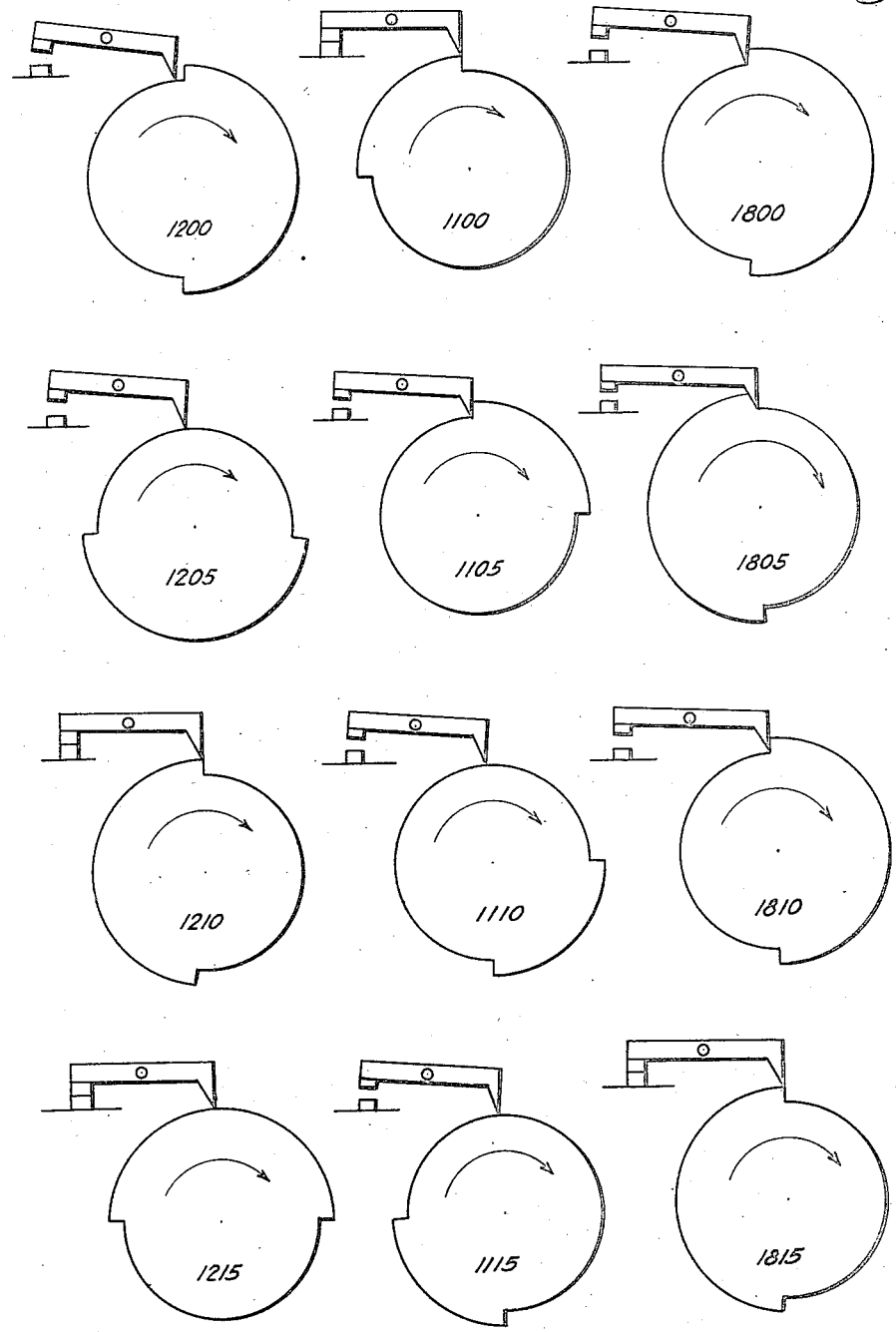
Fig. 2 shows the various cam positions at the commencement of each five minute period.

The various positions of the cams 12, 11 and 18 at the commencement of each five minute period are shown in the Figure 2. In this figure 1200, 1205, 1210 and 1215 indicate the positions of cam 12 at the beginning of the first, second, third and fourth five minute periods. Similarly 1100, 1105, 1110 and 1115 indicate the positions of the cam 11 at these times and 1800, 1805, 1810 and 1815 indicate the positions of cam 18 at these times. Cams 12 and 11 rotate 90° in five minutes while cam 18 rotates 180° in five minutes.

The mechanical arrangements for driving the cams, radiogoniometer, etc., are shown in Figures 3, 4, 5, the two latter figures being end views taken at right angles to Figure 3 and at either end thereof. In Figure 3, P is a pointer.

Another method of transmitting a non-directional signal is to arrange for the relays to connect the loops together and to earth through a suitable coil.

Means for providing the whole sequence of four distinctive types of transmission, i. e., non-directive, fixed equi-signal, rotating equi-signal, and rotating figure-of-eight diagrams have been described, but, by a suitable adjustment of cams and contacts, any alteration desired may be made to this sequence in order to provide for the requirements of the particular service on which such a beacon can be employed.

Having thus described our invention and the operation thereof, what we claim is:

1. A radio beacon installation comprising a pair of mutually perpendicular fixed frames, means for energizing said frames simultaneously to emit a call sign, means for energizing said frames to emit stationary equi-signal zones, means for energizing said frames to emit rotating equi-signal zones, means for energizing said frames to emit a field which may be represented by a rotating figure-of-eight and a predetermined train of signals each time said figure-of-eight passes through a predetermined bearing and means for cyclically and successively rendering said various energizing means operative for predetermined periods.

2. A beacon transmitting system comprising a pair of mutually perpendicular fixed frames, a radiogoniometer associated therewith, a clutch for putting the rotatable member of said radiogoniometer in driving connection with an electric motor or other source of power, a call sign code wheel and a pair of Morse signal wheels, a second motor or other source of power for driving these three wheels, a pair of keying relays associated each with one of the fixed frames, a code wheel and contact device adapted to be driven from said first mentioned motor or other device through said clutch, a pair of changeover switches for associating said keying relays to be controlled by the different signalling devices at different times and a plurality of cam switch devices driven by said first mentioned motor or other device for closing the clutch and actuating the changeover switches so that the required signals are emitted during predetermined periods and in a predetermined succession.

3. A radio beacon transmitter comprising in combination a pair of revolving loop aerials arranged at right angles to one another, electrical and mechanical means for first energizing both of said loops simultaneously during a fixed interval of time to emit non-directional radiant energy, a second electrical and mechanical means for subsequently energizing both of said loops to emit a code signal in timed relationship to stationary equi-signal zones during an interval of time equal to said first means, a third electrical and mechanical means for next rotating and energizing both of said loops and emitting a call signal of equi-signal zones for an interval of time equal to said second means, a fourth electrical and mechanical means for thereafter energizing only one of said loops to emit a train of signal energy at a predetermined bearing for an interval of time equal to the said third means, and a fifth mechanical and electrical means for finally placing said system in a position to repeat the cycle of all said first, second, third and fourth means.

4. In a radio beacon transmitter comprising in combination a pair of loop aerials arranged at right angles to one another and mounted for rotation, cam and contact means for first energizing both loop aerials simultaneously during a fixed interval of time to emit non-directional radiant energy, a second cam and contact means for energizing both of said loops to emit a code signal in time relationship to stationary equi-signal zones during an interval of time equal to an operational cycle of said first means, a third cam and contact means for rotating and energizing both of said loops and emitting a call signal of equi-signal zones for an interval of time equal to an operational cycle of said second means, a fourth means comprising a relay for energizing only one of said loops to emit a train of signal energy at a predetermined bearing for an interval of time equal to an operational cycle of said third means, and a fifth cam and contact means for placing said system in a position to repeat the cycle of all said first, second, third and fourth means.

5. A radio beacon installation comprising a pair of loop aerials for emitting signals in two directions simultaneously, a rotatable member associated with said loop aerials, an oscillation generator adapted to initiate radio frequency energy for transmission through said rotatable member and said aerials, a device for keying the energy of said oscillation generator, and means for carrying out a sequence of operations in respect to the joint actuation of said rotatable member and said keying device thereby to produce, firstly, a non-directional code signals; secondly, a stationarily directed combination of two signals each from one of said aerials respectively so as to obtain an overlapping signal in an equi-signal zone midway of the directional axes of the two antennæ; thirdly, to produce rotation of the equi-signal zone; and finally, to produce a characteristic code signal synchronously with the rotational effect of a directed beam.

6. A radio beacon installation in accordance with claim 5 further characterized in that means are provided for intermittently rotating said rotatable member and for causing said keying device to so modulate the energy of said oscillation generator that a suitable predetermined signal combination is directionally transmitted when the rotating directional effect passes through a predetermined angle of orientation.

7. A radio signalling system comprising a pair of antenna loops, a source of high frequency energy, means including a rotatable member for producing a rotationally directional effect in the transmission of energy of said high frequency source from said loops, means including cam-operated switching means for keying the output of said high frequency energy source, and means including a cam-operated switching device in co-operation with a system of relays for causing said loops to transmit signals at one time having a non-directional effect, at another time having a rotational effect, and at still another time for giving a rotational effect to the transmission of an equi-signal zone of bi-directionally radiated energy.

JOHN MAGARRY FURNIVAL.
WILLIAM FREDERICK BUBB.